(12) United States Patent
Hanzawa

(10) Patent No.: US 6,572,946 B2
(45) Date of Patent: Jun. 3, 2003

(54) OPTICAL DISC

(75) Inventor: Shinichi Hanzawa, Yamanashi-ken (JP)

(73) Assignee: Pioneer Corporation, Tokyo (JP)

( * ) Notice: Subject to any disclaimer, the term of this patent is extended or adjusted under 35 U.S.C. 154(b) by 49 days.

(21) Appl. No.: 09/874,019

(22) Filed: Jun. 6, 2001

(65) Prior Publication Data

US 2001/0048994 A1 Dec. 6, 2001

(30) Foreign Application Priority Data

Jun. 6, 2000 (JP) ........................................ 2000-169133

(51) Int. Cl.⁷ ................................................. B32B 3/02
(52) U.S. Cl. ................. 428/64.1; 428/64.4; 430/270.11
(58) Field of Search .............................. 428/64.1, 64.4, 428/913; 430/270.11, 495.1, 945; 369/283

(56) References Cited

U.S. PATENT DOCUMENTS

| | | | | |
|---|---|---|---|---|
| 4,981,743 A | * | 1/1991 | Ho ................................ 428/64 |
| 5,313,452 A | * | 5/1994 | Usami ...................... 369/275.1 |
| 5,424,102 A | * | 6/1995 | Mizukuki ................... 427/510 |
| 5,470,691 A | * | 11/1995 | Arai ............................ 430/270 |
| 5,648,197 A | * | 7/1997 | Kuroda ................... 430/270.11 |
| 2002/0034155 A1 | * | 3/2002 | Usami ......................... 369/286 |
| 2002/0048256 A1 | * | 4/2002 | Yamasaki .................... 269/283 |

* cited by examiner

*Primary Examiner*—Elizabeth Mulvaney
(74) *Attorney, Agent, or Firm*—Arent Fox Kintner Plotkin & Kahn PLLC

(57) ABSTRACT

A substrate has a disk-like shape with a thickness of about 1.2 mm, and a diameter of D1, and further a central hole of diameter D2. A signal recording layer is formed on the substrate, and further a transparent sheet, through which a laser beam passes to record and reproduce information, is stacked up on the signal recording layer. The transparent sheet has a circular shape with a diameter d1, and the central hole thereof has a diameter d2. In a size-relationship of these diameters, d1 is formed to be smaller than D1, and d2 is formed to be larger than D2. In the other words, the transparent sheet, which is attached on the substrate so as to cover the signal recording layer, has outer and inner ends being positioned inside both an outer peripheral end of the substrate and a peripheral end of the central hole, so that a damage such as tearing off the peripheral end of the transparent sheet can be avoided since the peripheral end is inwardly apart from a finger-touch-area.

8 Claims, 1 Drawing Sheet

OPTICAL DISC

BACKGROUND OF THE INVENTION

1. Field of the Invention

The present invention relates to an optical disc as an information recording and reproducing medium for optically recording and reproducing information, in which a light permeable layer is mounted on a substrate, and a laser beam is irradiated from a side of the light permeable layer, not passing through the substrate.

The present application claims priority from Japanese Application No. 2000-169133, the disclosure of which is incorporated herein by reference for all purposes.

2. Description of the Related Art

A conventional optical disc has such a structure that is provided with a replica substrate with a concave and convex surface on a single side thereof, made of plastic with the light permeability, a signal recording surface having a reflective membrane and a recording membrane on the concave and convex surface, and a protective membrane formed on the signal recording surface, so that the signal recording surface can be sufficiently protected, and also a manufacturing step of the disc can be simplified. In this conventional optical disc, a laser beam is irradiated from a side of a substrate surface, and passes through the substrate to record and reproduce information. Since the substrate of such an optical disc is a layer through which the laser beam passes, it is required to thin the thickness of the substrate in order to improve a recording density thereof. However, the above mentioned substrate is usually formed by an injection molding, so that there is a limitation in thinning the substrate.

On the other hand, recently, an optical disc having an light permeable layer made from a thin membrane on a signal recording surface of a substrate is proposed, in which a laser beam is irradiated from a side of the light permeable layer, and does not pass through the substrate to record and reproduce information. In this case, the thickness of the substrate has no relation with realizing a high recording density of the disc since the substrate does not operate as the light permeable layer. Therefore, the substrate may have a normal thickness, in which the concave and convex surface can be exactly transcribed on an upper surface of the substrate by the injection molding, since the substrate need not be thinned.

In the recently proposed optical disc, whereas the thickness of the substrate can be freely designed, it becomes a serious problem how the light permeable layer is formed since durability of the light permeable layer with regard to the thickness and forming condition of the layer has a large effect upon recording and reproducing characteristics.

In addition, the conventional optical disc has such a problem that a peripheral end of the substrate is apt to be damaged since the disc is usually held by gripping together the peripheral end of a central hole of the substrate and an outer peripheral end of the substrate. In the above recent optical disc with the light permeable layer, such a problem has not yet been discussed. Thus, there is a fear that a deterioration such as tearing off of the light permeable layer may be caused in the peripheral end when forming a light permeable membrane extending to the peripheral end.

SUMMARY OF THE INVENTION

The present invention aims to overcome these conventional problems, and an object of the present invention is to provide an optical disc having a light permeable layer formed on a signal recording surface, in which an light permeable layer is formed on a signal recording surface of a substrate, and a laser beam is irradiated from a side of the light permeable layer to record and reproduce information. The optical disc is designed so as to form the uniformly thin light permeable layer with an improved durability, resulting in a high quality thereof.

In order to achieve the above objects, there is provided an optical disc according to the present invention, which comprises a substrate having a disk-like shape, a signal recording surface formed on the substrate, and a light permeable layer stacked up on the signal recording surface with a circular shape. In the optical disc, a laser beam of wave-length 390–440 nm is irradiated onto the signal recording surface through an objective lens of a numerical aperture 0.8–0.9 and then the light permeable layer to record and/or reproduce information, and a diameter size of the light permeable layer is set to be smaller than one of the substrate.

According to this feature with regard to a size of the light permeable layer, the transparent sheet has no effect of an outer force even if the outer force, for example, by fingers is applied to the outer peripheral end of the substrate, so that the transparent sheet can maintain an original good condition thereof.

Furthermore, the present invention has the following features in addition to the above-mentioned features. Namely, the light permeable layer comprises a transparent sheet, and further a protective layer is formed so as to cover an surface of the substrate exposed between an outer peripheral end of the transparent sheet and an outer peripheral end of the substrate. Also, a membrane thickness of the transparent sheet is formed to be 10–350 $\mu$m, and a thickness of the substrate is formed to be more than 0.3 mm. Moreover, the substrate may be colored for discriminating a kind of discs.

According to these features, the protective layer can further improve durability of the transparent sheet. Furthermore, the above-mentioned thickness, i.e., 10–350 $\mu$m, of the transparent sheet allows the transparent sheet to effectively function as both a protective layer and a light permeable layer so that a high density of optical disc can be formed, and also the thickness, more than 0.3 mm, of the substrate allows the substrate to be strengthened.

In addition, the coloring of discs allows the optical disc to be discriminated according to a kind of disc, for example, a reproducing only disc, a writable disc, and a re-writable disc through applying a different color to each kind of disc, so that a convenience of usage can be improved.

BRIEF DESCRIPTION OF THE DRAWINGS

These and other objects and advantages of the present invention will become clearly understood from the following description with reference to the accompanying drawings, wherein.

DETAILED DESCRIPTION OF THE PREFERRED EMBODIMENTS

Figure 1:
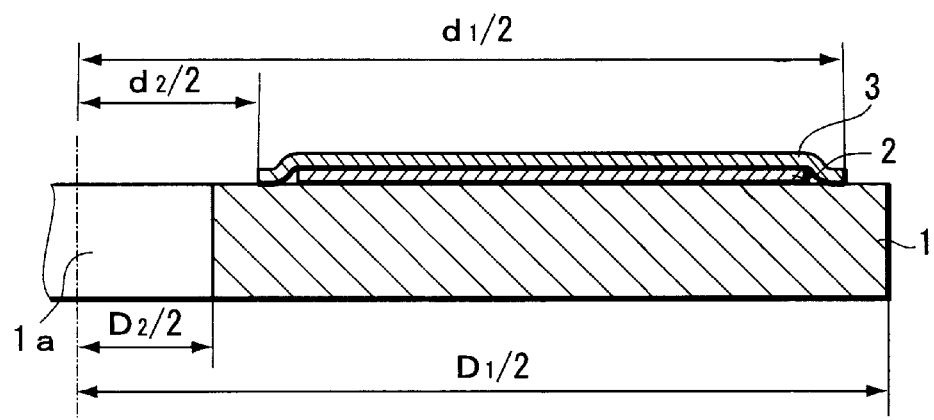
FIG. 1 is a partial cross-sectional view showing an optical disc related to an embodiment of the present invention.

Embodiments of the present invention will be described below with reference to the accompanying drawings. FIG. 1 is a partial cross-sectional view showing an optical disc related to an embodiment of the present invention. Referring to FIG. 1, a substrate 1 is a disk-like one, a diameter of which is shown as D1, and also a central hole 1a of which has a diameter shown as D2. The substrate has a thickness of approximately 1.2 mm. A signal recording layer 2 is formed on the substrate 1, and on the layer 2 a transparent sheet 3 is stacked up. The signal recording layer 3 is composed of an organic coloring matter material, and a phase change recording layer.

The transparent sheet 3 has a circular shape, in which a diameter of the sheet 3 is shown as d1, and a diameter of a central hole as d2. In this case, the diameter d1 is set to be smaller than the diameter D1 of the substrate, while the diameter d2 of the central hole is set to be larger than the diameter D2 of the central hole of the substrate. In summary, the transparent sheet 3 is attached on the substrate to cover the signal recording layer 2, but both peripheral ends of the sheet 3 are formed to be located inside both the outer peripheral end of the substrate and the peripheral end of the central hole 1a. Thereby, a damage such as tearing off the peripheral end of the transparent sheet can be avoided since the peripheral end is inwardly apart from a finger-touch-area.

Figure 2:
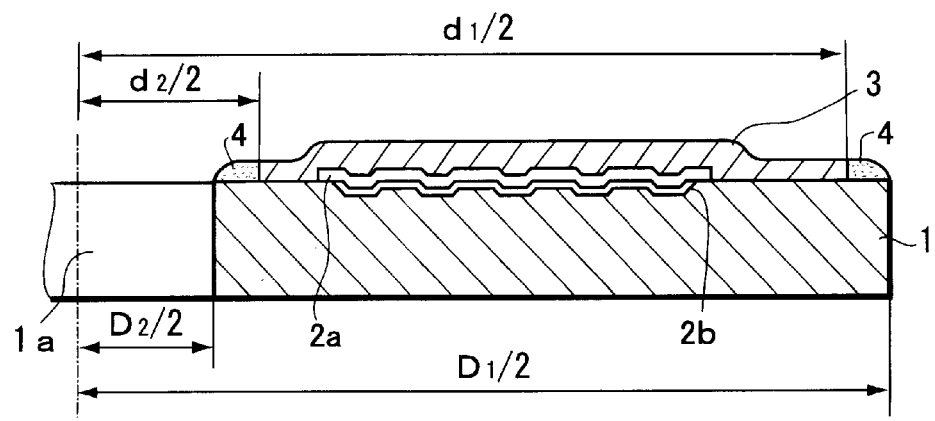
FIG. 2 is a partial cross-sectional view showing an optical disc related to another embodiment of the present invention.

FIG. 2 is a partial cross-sectional view showing an optical disc related to another embodiment of the present invention. A basic structure of the optical disc is the same as one of FIG. 1. A signal recording layer 2 is formed on the substrate 1 with a disk-like shape, a diameter of which is shown as D1, and a diameter of a central hole of which is shown as D2, and on the layer 2 is stacked up a circular transparent sheet 3, a diameter of which is shown as d1, and a diameter of a central hole of which is shown as d2. In FIG. 2, a reflective layer 2b is provided as a member of the signal recording layer under a recording layer 2a in which concave and convex patterns such as pits and grooves are formed.

A size of the transparent sheet 3 is the same as one of FIG. 1, namely d1 is smaller than D1, and d2 is larger than D2. Also, as well as FIG. 1, a partial surface of the substrate 1 is exposed since a peripheral end of the transparent sheet 3 is attached so as to be located inside both the outer peripheral end of the substrate 1 and the peripheral end of the central hole 1a. In this embodiment, however, a protective layer 4 is provided on the exposed surface of the substrate 1 along the inner and outer peripheral ends. Thereby, a reliability of the signal recording surface can be prevented from lowering based on that the exposed substrate surface touches an outer atmosphere, so that durability of the optical disc can be further improved. Moreover, the protective layer 4 is formed through pasting an ultraviolet hardening resin around the exposed surface of the substrate 1, and hardening the same.

In the above each embodiment, the substrate 1 may be made of resin such as polycarbonate by an injection molding as well as a normal optical disc. The substrate 1 of the present application, however, may be made of the other resin, or material other than the resin, i.e., glass or ceramic, etc. since it requires no light permeability. Moreover, the thickness of the substrate 1 is preferably more than 0.3 mm since it is too thin to transcribe a signal surface in the injection molding.

It is preferable to use an optically transparent material with little double refraction as the transparent sheet 3. For example, the resin such as polycarbonate, acrylic, and polyolefine is optimum. Furthermore, the transparent sheet 3 may be attached on the signal recording layer by an adhesive agent, but the attachment may be performed by using the sheet 3 having stickiness on itself.

Referring to a membrane thickness of the transparent sheet 3 as the light permeable layer, it is suitable for a high numerical aperture, for example 0.8–0.9, of an objective lens to form the transparent sheet 3 as thin as possible. However, it needs a thickness of at least 10 μm when considering a function of the protective layer, but on the other hand, a thickness of less than 350 μm in order to correspond with a short wave-length laser (for example, a blue laser) having a wave-length 390–440 nm. To sum up, in the optical disc of the present invention, the laser beam of a wave-length 390–440 nm is preferably irradiated onto the signal recording surface 2 through the transparent sheet 3 as the light permeable layer, using the objective lens of the numerical aperture 0.8–0.9, in order to record and/or reproduce information.

As a usage embodiment of the optical disc of the present application, it is preferable to use the optical disc stored in a cartridge in order to protect a surface of the transparent sheet 3 as a light permeable layer.

In addition, it is possible to color the substrate 1 according to each kind of the optical disc such as a reproducing only disc(CD-ROM), a writable disc(CD-R), and a re-writable disc(CD-RW) since the substrate 1 has no function as the light permeable layer. Thereby, it would be easy to discriminate the kind of the disc.

According to the present invention as mentioned above, an optical disc, which has a light permeable layer on a signal recording surface of a substrate to record and reproduce information by irradiating a laser beam from a side of the light permeable layer, is supplied, in which the light permeable layer is maintained with a uniformly thin membrane thickness, and durability thereof is improved.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An optical disc comprising:
   a substrate having a disk-like shape;
   a signal recording surface formed on the substrate; and
   a light permeable layer stacked up on the signal recording surface, and having a circular shape;
   wherein a laser beam of wave-length 390–440 nm is irradiated onto the signal recording surface through an objective lens of a numerical aperture 0.8–0.9 and then the light permeable layer to record and/or reproduce information, and
   wherein a diameter size of the light permeable layer is smaller than one of the substrate.

2. The optical disc according to claim 1,
   wherein the light permeable layer is a transparent sheet.

3. The optical disc according to claim 1, further comprising:
   a protective layer formed so as to cover a surface of the substrate exposed between an outer peripheral end of the light permeable layer and an outer peripheral end of the substrate.

4. The optical disc according to claim 1,
   wherein a membrane thickness of the light permeable layer is 10–350 μm, and a thickness of the substrate is more than 0.3 mm.

5. The optical disc according to claim 2,
wherein a membrane thickness of the light permeable layer is 10–350 μm, and a thickness of the substrate is more than 0.3 mm.

6. The optical disc according to claim 1,
wherein the substrate is colored for discriminating a kind of discs.

7. The optical disc according to claim 2,
wherein the substrate is colored for discriminating a kind of discs.

8. The optical disc according to claim 3,
wherein the protective layer is formed so as to cover an surface of the substrate exposed between an inner peripheral end of the light permeable layer and an inner peripheral end of the substrate.

\* \* \* \* \*